(12) United States Patent
Kripalani

(10) Patent No.: US 9,483,201 B2
(45) Date of Patent: Nov. 1, 2016

(54) ADMINISTERING A SHARED, ON-LINE POOL OF DATA STORAGE RESOURCES FOR PERFORMING DATA STORAGE OPERATIONS

(71) Applicant: CommVault Systems, Inc., Oceanport, NJ (US)

(72) Inventor: Sanjay Harakhchand Kripalani, Morganville, NJ (US)

(73) Assignee: CommVault Systems, Inc., Tinton Falls, NJ (US)

( * ) Notice: Subject to any disclaimer, the term of this patent is extended or adjusted under 35 U.S.C. 154(b) by 657 days.

(21) Appl. No.: 13/786,793

(22) Filed: Mar. 6, 2013

(65) Prior Publication Data

US 2014/0040579 A1 Feb. 6, 2014

Related U.S. Application Data

(60) Provisional application No. 61/677,712, filed on Jul. 31, 2012.

(51) Int. Cl.
*G06F 12/02* (2006.01)
*G06F 3/06* (2006.01)
*G06F 11/14* (2006.01)

(52) U.S. Cl.
CPC ............ *G06F 3/065* (2013.01); *G06F 3/0604* (2013.01); *G06F 3/067* (2013.01); *G06F 11/1469* (2013.01); *G06F 11/1448* (2013.01); *G06F 11/1451* (2013.01); *G06F 11/1453* (2013.01); *G06F 11/1456* (2013.01); *G06F 2201/84* (2013.01)

(58) Field of Classification Search
None
See application file for complete search history.

(56) References Cited

U.S. PATENT DOCUMENTS 4,084,231 A 4/1978 Capozzi et al.
4,267,568 A 5/1981 Dechant et al.
(Continued)

FOREIGN PATENT DOCUMENTS

EP 0259912 3/1988
EP 0405926 1/1991
(Continued)

OTHER PUBLICATIONS

U.S. Appl. No. 13/786,874, filed Mar. 6, 2013, Sanjay Harakhchand Kripalani, Administering a Shared, On-Line Pool of Data Storage Resources for Performing Data Storage Operations.
(Continued)

*Primary Examiner* — Charles Rones
*Assistant Examiner* — Ryan Dare
(74) *Attorney, Agent, or Firm* — Knobbe, Martens, Olson & Bear, LLP

(57) ABSTRACT

A data storage system according to certain aspects manages and administers the sharing of storage resources among clients in the shared storage pool. The shared storage pool according to certain aspects can provide readily available remote storage to clients in the pool. A share list for each client may be used to determine where data is stored within the storage pool. The share list may include clients that are known to each client, and therefore, a user may feel more at ease storing the data on the clients in the storage pool. Management and administration of the storage pool and backup and restore jobs can be performed by an entity other than the client, making backup and restore more streamlined and simple for the clients in the pool.

22 Claims, 11 Drawing Sheets

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,542,972 B2 | 4/2003 | Ignatius et al. |
| 6,643,748 B1* | 11/2003 | Wieland ............ 711/152 |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,130,970 B2 | 10/2006 | Devassy et al. |
| 7,152,144 B2* | 12/2006 | Fujita et al. ............ 711/148 |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 8,170,995 B2 | 5/2012 | Prahlad et al. |
| 8,229,954 B2 | 7/2012 | Kottomtharayil et al. |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,578,120 B2 | 11/2013 | Attarde et al. |
| 8,621,178 B1* | 12/2013 | Lazar ............ 711/173 |
| 2006/0224846 A1 | 10/2006 | Amarendran et al. |
| 2009/0043980 A1* | 2/2009 | McBride et al. ............ 711/162 |
| 2009/0319534 A1 | 12/2009 | Gokhale |
| 2012/0066450 A1 | 3/2012 | Yochai et al. |
| 2012/0124307 A1 | 5/2012 | Ashutosh et al. |
| 2012/0150818 A1 | 6/2012 | Vijayan Retnamma et al. |
| 2012/0150826 A1 | 6/2012 | Vijayan Retnamma et al. |
| 2014/0040580 A1 | 2/2014 | Kripalani et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Arneson, "Mass Storage Archiving in Network Environments" IEEE, Oct. 31-Nov. 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

* cited by examiner

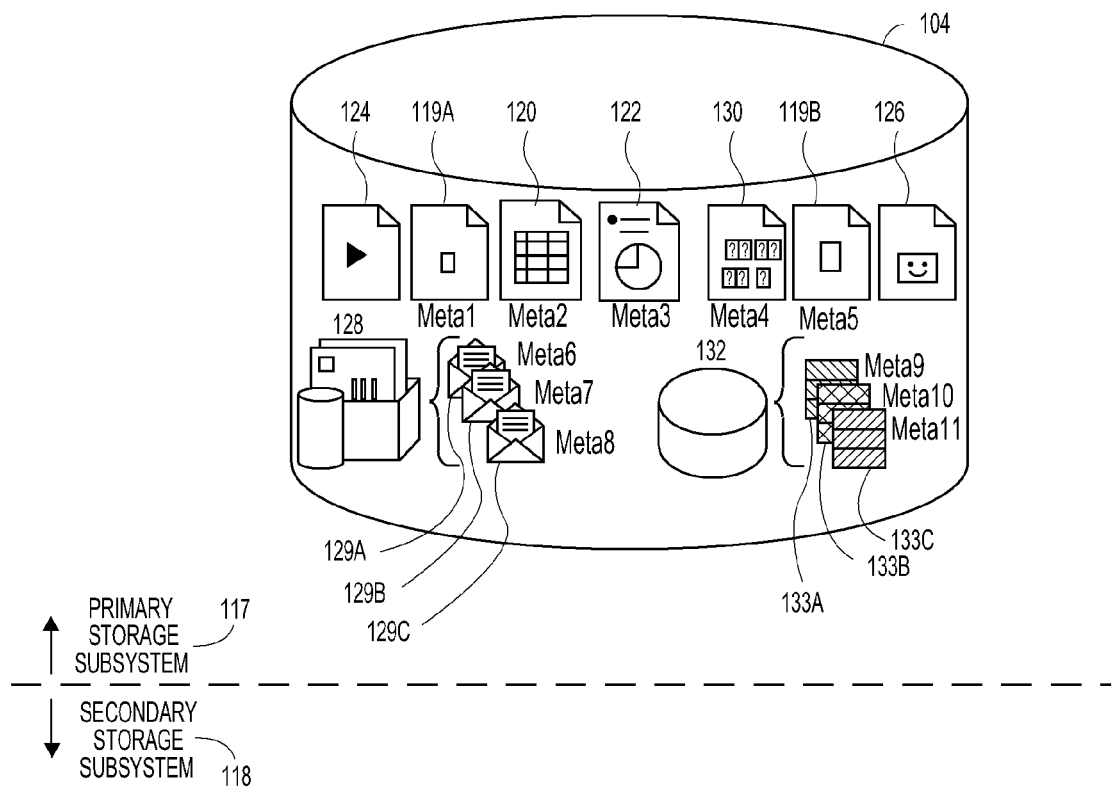
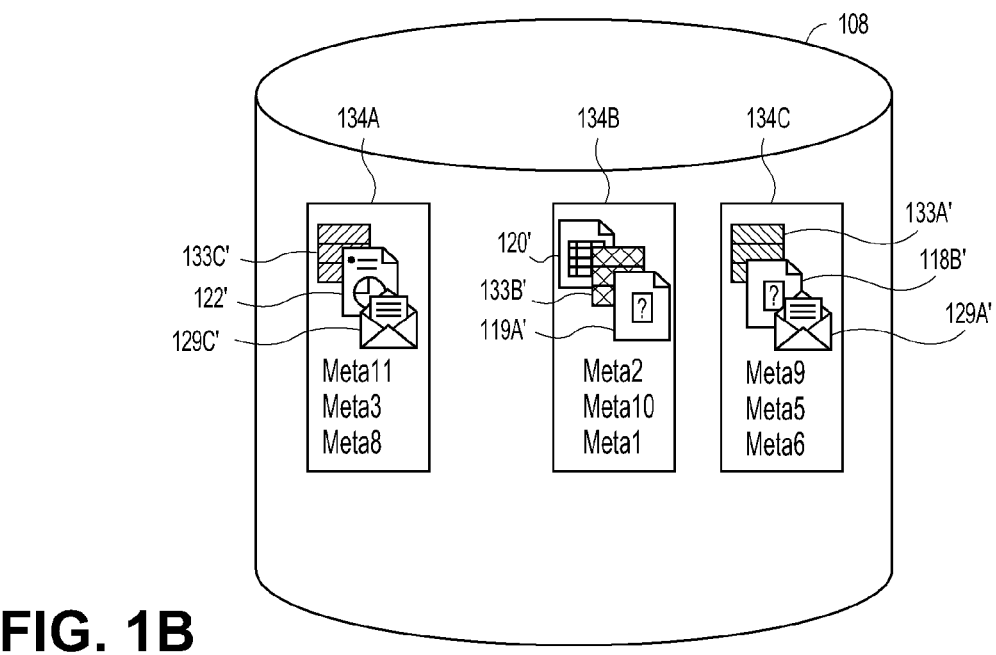
FIG. 1B

CLIENT CONFIGURATION 591

| CLIENT | STORAGE DEVICE | AVAILABLE SPACE | TYPE OF STORAGE |
|---|---|---|---|
| CLIENT A | STORAGE DEVICE A1 | 100 GB | ... |
| CLIENT A | STORAGE DEVICE A2 | 1 TB | ... |
| CLIENT B | STORAGE DEVICE B1 | ... | ... |
| CLIENT C | STORAGE DEVICE C1 | ... | ... |
| CLIENT D | ... | ... | ... |
| ... | ... | ... | ... |

INDEX 592

| JOB ID | JOB TYPE | CLIENT | LOCATION | STATUS |
|---|---|---|---|---|
| 1 | BACKUP | CLIENT A | CLIENT B | OK 06/27/12 |
| 2 | BACKUP | CLIENT A | CLIENT B/C | FAILED |
| 3 | RESTORE | CLIENT A | CLIENT B | OK 06/29/12 |
| 4 | BACKUP | CLIENT C | CLIENT D | OK 06/01/12 |
| 5 | RESTORE | CLIENT E | CLIENT J | ... |
| 6 | BACKUP | CLIENT H | CLIENT Z | ... |
| 7 | ... | ... | ... | ... |

FIG. 5

ADMINISTERING A SHARED, ON-LINE POOL OF DATA STORAGE RESOURCES FOR PERFORMING DATA STORAGE OPERATIONS

INCORPORATION BY REFERENCE TO RELATED APPLICATIONS

This application claims the benefit of priority under 35 U.S.C. §119(e) of U.S. Provisional Application No. 61/677,712 filed on Jul. 31, 2012 and entitled "ADMINISTERING A SHARED, ON-LINE POOL OF DATA STORAGE RESOURCES FOR PERFORMING DATA STORAGE OPERATIONS", the entirety of which is incorporated herein by reference. Any and all priority claims identified in the Application Data Sheet, or any correction thereto, are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

SUMMARY

In view of the above, individual users may create copies of production data, and access the copies for recovery purposes. Such recovery copies can be accessed in the event their computers or devices fail or otherwise become unavailable. For instance, in some existing systems the data may be copied to a storage device that is separate from personal computers or devices, such as a portable or an external hard drive or storage available from a storage provider. However, in some cases, users may not have sufficient storage capacity to meet their data protection needs, or may not want to maintain large amounts of data storage devices in their home or office. Moreover, even where a user purchases or otherwise has access to sufficient storage capacity, they may have excess storage capacity and may not be able to efficiently utilize all of the storage capacity that they have at any given time.

Due to the above challenges, there is a need for a user-friendly, efficient mechanism for individuals or other entities to meet their data protection needs. In order to address these and other challenges, certain storage systems disclosed herein provide a centralized storage manager that administers a shared, on-line storage pool. For instance, each member in the storage pool uses an on-line interface to contribute local storage resources to the wider pool. A storage pool manager manages membership to the pool and administers the pool resources. The manager also services requests from the various users to backup data to the pool.

Some or all of the members in the pool locally install a backup client that transmits requests to the storage manager to back up that user's data. In some cases, some or all of the users also locally install a media agent module that conducts backup data from other users to that user's local storage pool devices. The storage pool manager allocates the storage operations amongst the resources in the pool, monitors and/or reports the success or failure of storage operations, the availability of particular resources in the pool, etc.

Because secondary copies of a member's data may be stored in target media belonging to one or more other members, the secondary copies are stored remotely from the primary copies of the data. This provides additional security in the event of disasters or other events in which local copies of data are lost. Thus, the secondary copies can act as disaster recovery copies. Also, the pool can include generally any number (e.g., tens, hundreds, thousands or millions of members) of members. Thus, secondary copies or portions thereof can be allocated amongst storage resources of many geographically diverse members, providing additional protection. In such cases, in the event that the storage resources of any given member in the pool are compromised, only a relatively small portion of a user's data, if any, may be lost.

The many-user, de-centralized nature of the sharing scheme can also provide a high degree of flexibility. For instance, if a particular member's storage resources are not currently or historically available, the storage manager may select other, relatively more available storage resources in the pool for a given data protection job. Also, storage resources associated with members having excess storage capacity can be utilized by other members in the pool. Moreover, members who would prefer not to locally maintain large amounts of storage media can utilize the storage pool to meet their storage needs. These are just a few examples of some benefits provided by the systems and methods provided herein.

The system facilitates efficient sharing of storage resources in a given storage pool amongst the resources of the various members (also referred to as clients). In the shared storage pool, secondary copies of client data in some embodiments are created by transferring data directly between two clients, e.g., through a peer-to-peer connection, rather than being uploaded to some third party location, for example. For instance, the storage manager may conduct a backup job by copying data from a first client to storage associated with one or more second clients in the storage pool.

The shared storage pool according to certain aspects may operate according to share lists for each client. For example, where the storage manager is tasked with backing up data for a first client in the pool, the storage manager may select one or destination storage devices in the pool only if the client(s) owning or otherwise associated with those storage devices appear on the share list for the first client. The storage manager can maintain and administer updates to the share list, and in some embodiments users in the pool update their share lists using an interface hosted by the storage manager, such as a GUI on a web portal, for example. In some embodiments, such a share list can be derived from, utilize, or otherwise be based on the friend list from some third party web site or other source, such as a social networking website, such as Facebook or MSN. Data may be encrypted for privacy and security purposes.

A data storage system according to certain aspects manages and administers the sharing of storage resources among clients in the shared storage pool. The data storage system may include a backup module that manages backup and restore requests from clients in the storage pool. In response to a backup request from a particular client, the backup module may refer to the share list for that client and send information regarding the parameters related to backup or the storage pool. Such parameters may include backup location(s) among others and may be based on client configuration information. Client configuration information may include what type of processor and storage each client provides. The backup module may maintain a list of backup and restore operations and related status information, e.g., in the form of an index of jobs. In response to restore requests, the backup module may refer to such an index and send information regarding the parameters related to restore. Clients storing data for other clients may send backup/restore reports to the backup module and/or the client that requested backup or restore.

In this manner, a shared storage pool can provide readily available remote storage to clients in the pool. A share list for each client may be used to determine where data is stored within the storage pool. The share list may include clients that are known to each client, and therefore, a user may feel more at ease storing the data on the clients in the storage pool. Management and administration of the storage pool and backup and restore jobs can be performed by an entity other than the client, making backup and restore more streamlined and simple for the clients in the pool.

According to certain embodiments, a method is provided for administering a shared pool of storage resources. The method comprises electronically distributing data protection software to a plurality of users who each contribute storage resources to a shared pool of storage resources. The data protection software is installed on at least one computing device of each user, and the computing devices of the plurality of users are in networked communication with one another. The method further comprises for each respective user of the plurality of users, maintaining, by a storage manager executing in one or more processors, a first data structure including an indication as to an amount of available storage resources contributed to the shared pool by the respective user, and determining, by the storage manager, that a copy operation is to be performed on data stored in primary storage associated with a first user of the plurality of users. The method further comprises consulting, by the storage manager, the first data structure to identify available storage resources contributed to the shared pool by a second user of the plurality of users, and instructing the data protection software installed on the computing device of the first user to initiate the copy operation, where data involved in the copy operation is communicated to and copied into the contributed storage resources of the second user.

In some embodiments a method of creating secondary copies of data associated with user computing devices in a shared storage pool is provided. The method comprises, in response to instructions to create a secondary copy of first data stored in primary storage associated with a first computing device in a networked pool of computing devices, accessing a data structure associated with the first computing device that identifies a first subset of computing devices in the pool that are designated for sharing storage resources with the first computing device. The method further comprises instructing, by a storage manager module executing in one or more processors, the first computing device to transmit the first data to a media agent associated with at least one computing device in the pool and which creates the secondary copy of the first data in storage resources associated with a second computing device in the pool that is included in the first subset. In response to instructions to create a secondary copy of second data stored in primary storage associated with a third computing device in the pool, the method further comprises accessing a data structure associated with the third computing device that identifies a second subset of computing devices in the pool that are designated for sharing storage resources with the third computing device. The second subset includes the first computing device. The method further yet comprises instructing, by the storage manager module, the third computing device to transmit the second data to a media agent associated with at least one computing device in the pool and which creates the secondary copy of the second data in storage resources associated with the first computing device.

According to another aspect of the disclosure, a system for administering a shared pool of networked storage resources is provided. The system comprises one or more computer processors, and a storage manager in networked communication with a shared pool of storage resources and executing in the one or more computer processors. The storage manager is configured to electronically distribute data protection software to a plurality of users who each contribute storage resources to the shared pool of storage resources. The data protection software is installed on at least one computing device of each user, and the computing devices of the plurality of users are in networked communication with one another. For each respective user of the plurality of users, the storage manager is further configured to maintain a first data structure including an indication as to an amount of available storage resources contributed to the shared pool by the respective user. The storage manager is further configured to determine that a copy operation is to be performed on data stored in primary storage associated with a first user of the plurality of users, consult the first data structure to identify available storage resources contributed to the shared pool by a second user of the plurality of users, and instruct the data protection software installed on the computing device of the first user to initiate the copy operation, where data involved in the copy operation is communicated to and copied into the contributed storage resources of the second user.

According to yet another aspect of the disclosure a system for creating secondary copies of data associated with user computing devices in a shared storage pool is provided. The system comprises a first data structure associated with a first computing device in a networked pool of computing devices and listing a first subset of computing devices in the pool that are designated for sharing storage resources with the first computing device, where a second computing device in the pool included in the first subset. The system further comprises a second data structure associated with a third computing device in the pool and listing a second subset of computing devices in the pool that are designated for sharing storage resources with the third computing device, where the second subset includes the first computing device, one or more processors, and a storage manager module executing in the one or more processors. The storage manager is configured to, in response to instructions to create a secondary copy of first data stored in primary storage associated with the first computing device, access and review the first data structure to identify the first subset of computing devices in the pool, and instruct the first computing device to transmit the first data to a media agent associated with at least one computing device in the pool which creates the secondary copy of the first data in storage resources associated with the second computing device. The storage manager is further configured to, in response to instructions to create a secondary copy of second data stored in primary storage associated with the third computing device, access and review the second data structure to identify the second subset of computing devices in the pool, and instruct the third computing device to transmit the second data to a media agent associated with at least one computing device in the pool which creates the secondary copy of the second data in storage resources associated with the first computing device.

BRIEF DESCRIPTION OF THE DRAWINGS

FIG. 1B is a detailed view of a primary storage device, a secondary storage device, and some examples of primary data and secondary copy data.

FIG. 5 illustrates example data structures that can be used to administer a shared, on-line pool of data storage resources to create and manage secondary copies of data, according to certain embodiments.

DETAILED DESCRIPTION

Systems and methods are described herein for implementing administration of a shared pool of data storage resources for performing data storage operations in a data storage system. Examples of such systems and methods are discussed in further detail herein, e.g., with respect to FIGS. 2-7. Administration of a shared pool of data storage resources for performing data storage operations (e.g., automated administration) may additionally be implemented by information management systems such as those that will now be described with respect to FIGS. 1A-1E. And, as will be described, the componentry for implementing the techniques described herein relating to shared pooling of data storage resources can be incorporated into and implemented by such systems.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Figure 1A:
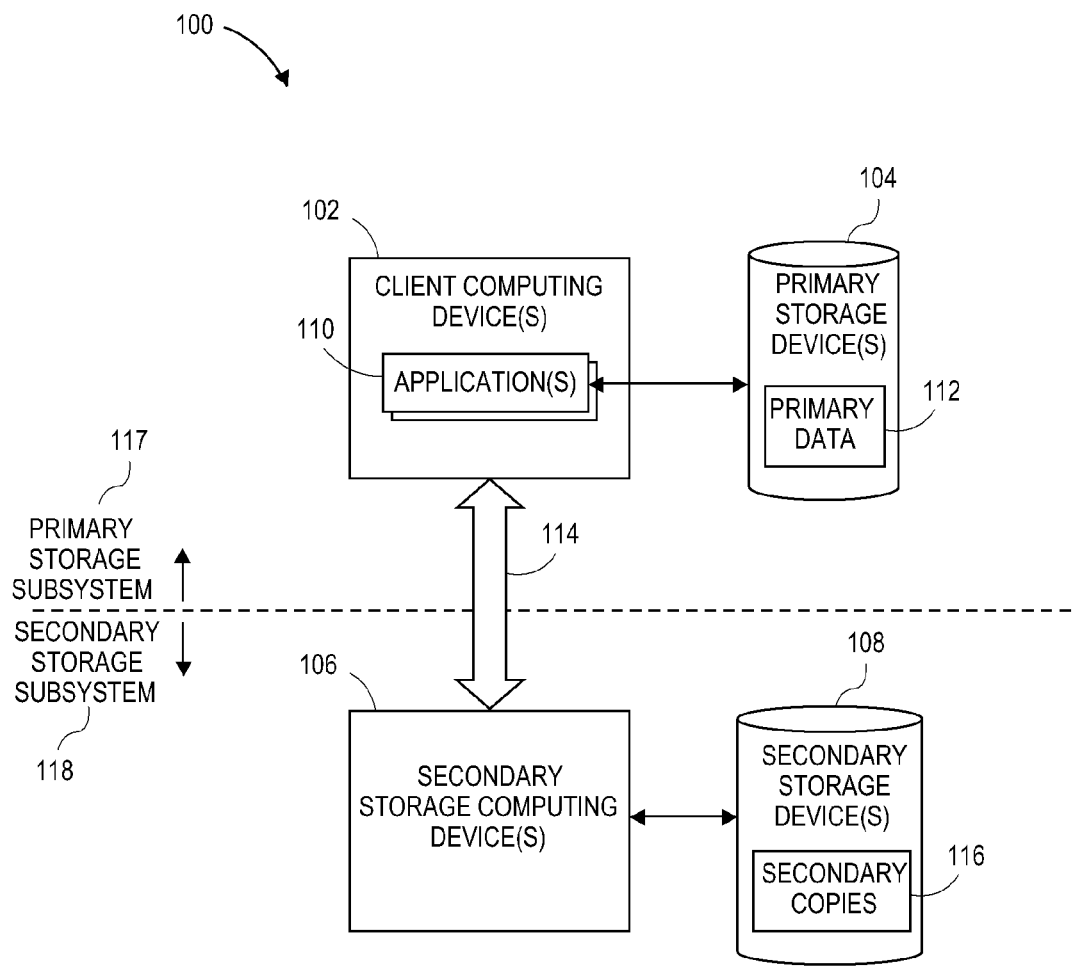
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. Pub. No. 2010-0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";

U.S. Pat. No. 7,035,880, entitled "MODULAR BACKUP AND RETRIEVAL SYSTEM USED IN CONJUNCTION WITH A STORAGE AREA NETWORK";

U.S. Pat. No. 7,343,453, entitled "HIERARCHICAL SYSTEMS AND METHODS FOR PROVIDING A UNIFIED VIEW OF STORAGE INFORMATION";

U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. No. 8,364,652, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0329534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Meta1-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
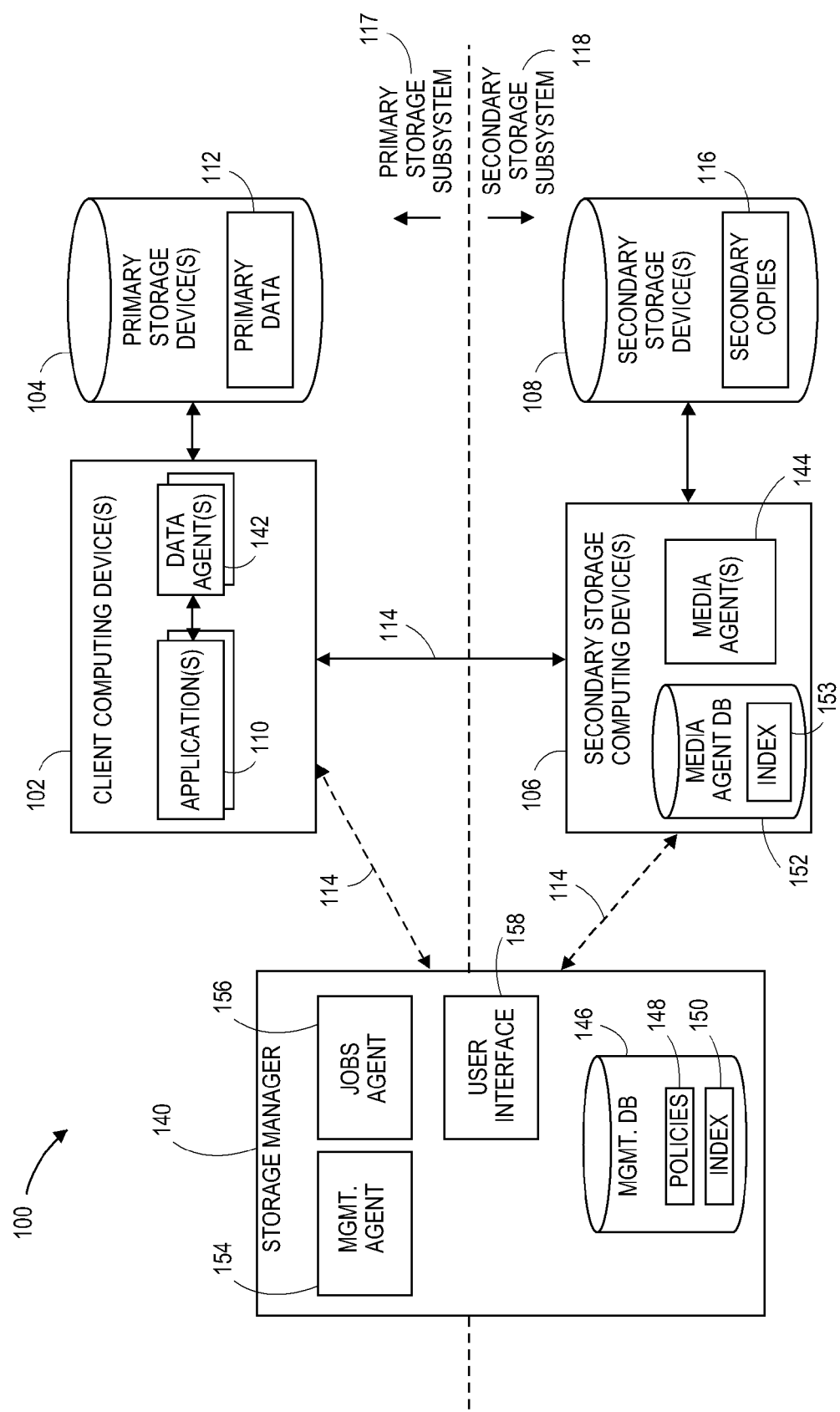
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
- initiating execution of secondary copy operations;
- managing secondary storage devices 108 and inventory/capacity of the same;
- allocating secondary storage devices 108 for secondary storage operations;
- monitoring completion of and providing status reporting related to secondary storage operations;
- tracking age information relating to secondary copies 116, secondary storage devices 108, and comparing the age information against retention guidelines;
- tracking movement of data within the information management system 100;
- tracking logical associations between components in the information management system 100;
- protecting metadata associated with the information management system 100; and
- implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
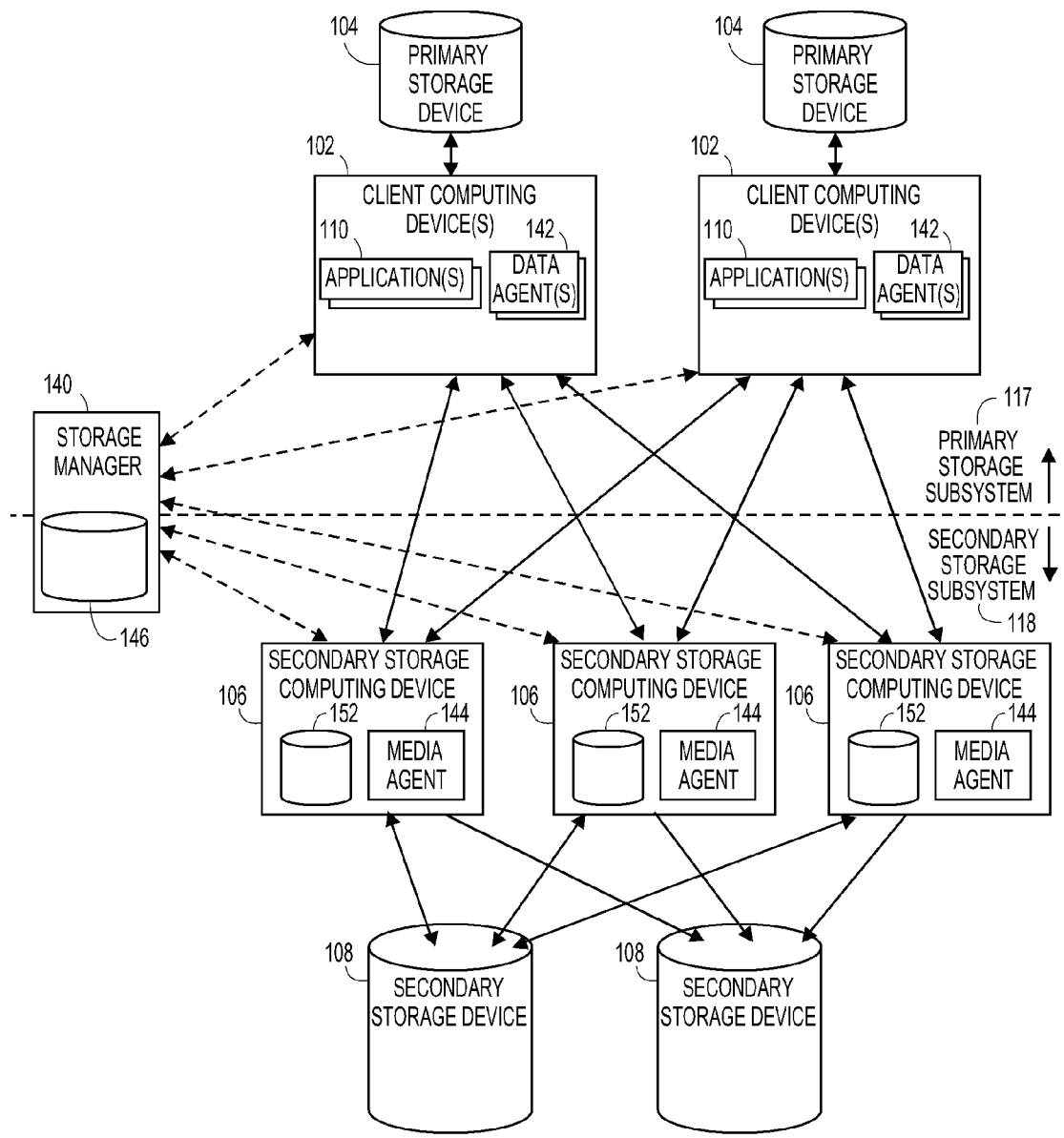
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups. Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s)

108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. Pub. No. 2012/0084269, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

schedules or other timing information, e.g., specifying when and/or how often to perform information management operations;
the type of secondary copy 116 and/or secondary copy format (e.g., snapshot, backup, archive, HSM, etc.);
a location or a class or quality of storage for storing secondary copies 116 (e.g., one or more particular secondary storage devices 108);
preferences regarding whether and how to encrypt, compress, deduplicate, or otherwise modify or transform secondary copies 116;
which system components and/or network pathways (e.g., preferred media agents 144) should be used to perform secondary storage operations;
resource allocation between different computing devices or other system components used in performing information management operations (e.g., bandwidth allocation, available storage capacity, etc.);
whether and how to synchronize or otherwise distribute files or other data objects across multiple computing devices or hosted services; and
retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

frequency with which primary data 112 or a secondary copy 116 of a data object or metadata has been or is predicted to be used, accessed, or modified;
time-related factors (e.g., aging information such as time since the creation or modification of a data object);
deduplication information (e.g., hashes, data blocks, deduplication block size, deduplication efficiency or other metrics);
an estimated or historic usage or cost associated with different components (e.g., with secondary storage devices 108);
the identity of users, applications 110, client computing devices 102 and/or other computing devices that created, accessed, modified, or otherwise utilized primary data 112 or secondary copies 116;
a relative sensitivity (e.g., confidentiality) of a data object, e.g., as determined by its content and/or metadata;
the current or historical storage capacity of various storage devices;
the current or historical network capacity of network pathways connecting various components within the storage operation cell;
access control lists or other security information; and
the content of a particular data object (e.g., its textual content) or of metadata associated with the data object.

Exemplary Storage Policy and Secondary Storage Operations

Figure 1E:
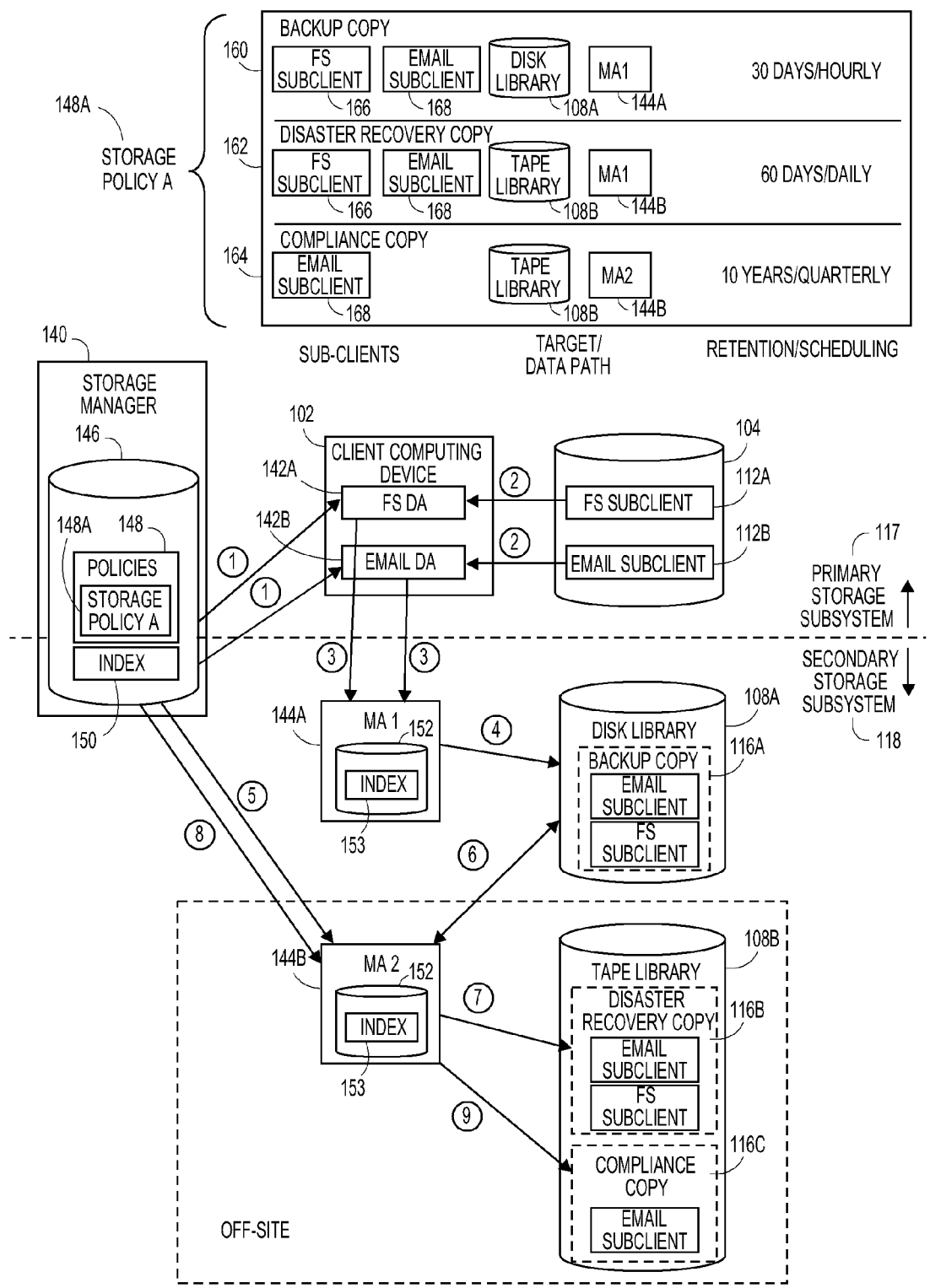
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

System Overview

Figure 2:
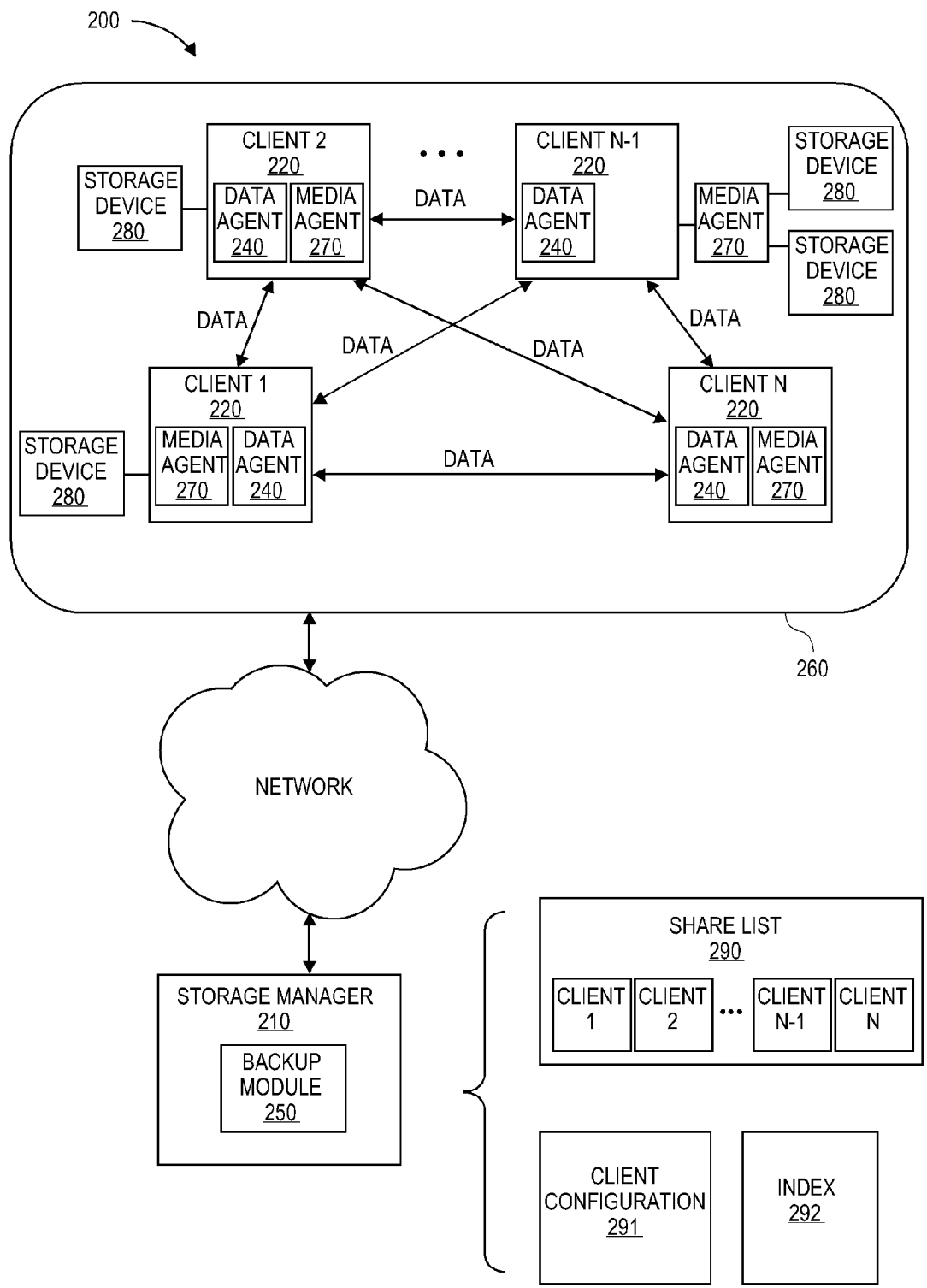
FIG. 2 is a block diagram of an example storage system configured to implement data protection operations using a shared, on-line pool of storage resources, according to certain embodiments.

FIG. 2 illustrates a block diagram of an exemplary networked storage architecture compatible with embodiments described herein. The system 200 is configured to perform storage operations on electronic data in a computer network. As shown, the system includes a storage manager 210 and one or more of the following: a client 220, a data agent 240, a backup module 250, a shared storage pool 260, a media agent 270, and a storage device 280. In addition, the storage system can also include one or more index caches as part of the media agent 270 and/or the storage manager 210. The index caches can indicate logical associations between components of the system, user preferences, management tasks, and other useful data, as described in greater detail in application Ser. No. 10/818,749, now U.S. Pat. No. 7,246,207, issued Jul. 17, 2007, herein incorporated by reference in its entirety.

As illustrated, the client computer 220 can be communicatively coupled with an information store, and/or the storage manager 210. The information store contains data associated with the client 220, which can include primary copies of production data generated by software applications executing on the client 220. The client 220 can also be in direct communication with the media agent 270 and/or the storage device 280. All components of the storage system 200 can be in direct communication with each other or communicate indirectly via the client 220, the storage manager 210, the media agent 270, or the like.

With further reference to FIG. 2, the client computer 220 (also generally referred to as a client) contains data in the information store that can be backed up in and then restored from the storage device 280. In an illustrative embodiment, the client 220 can correspond to a wide variety of computing devices including personal computing devices, laptop computing devices, hand-held computing devices, terminal computing devices, mobile devices, wireless devices, various electronic devices, appliances and the like. In an illustrative embodiment, the client 220 includes necessary hardware and software components for establishing communication with the other components of storage system 200. For example, the client 220 can be equipped with networking equipment and browser software applications that facilitate communication with the rest of the components from storage system 200. Although not illustrated in FIG. 2, each client 220 can also display a user interface. The user interface can include various menus and fields for entering storage and restore options. The user interface can further present the results of any processing performed by the storage manager 210 in an easy to understand format. For instance, the storage manager 210 may host software that executes on the storage manager 210 and generates the user interface, and the user interface may be accessible using a display on a client 220 or other computing device for interacting with the storage manager 210.

The client computing devices 220 are be remotely located from one another in certain embodiments. Moreover, some or all of the contributed storage resources 280 associated with a particular client 220 may be physically local to the client 220, or in some other cases, may be remotely located from the particular client 220. As one example, a first client computing device 220 (CLIENT 1) may correspond to a desktop computer of a first user that is located at the user's home, along with associated contributed storage devices 280. A second client computing device 2 (CLIENT 2) may correspond to a laptop computer of a second user, and the physical location of the laptop may change depending on user's travel habits. In one embodiment, while the location of the client computing device 220 of the second user may change, the contributed storage devices 280 associated with the second user, on the other hand, may reside in a permanent location, e.g., at the user's home. In other cases, the location of the contributed storage devices 280 may also change.

In certain embodiments, each client computing device 220 and the storage device(s) 280, data agent(s) 240 and media agent(s) 270 associated therewith are associated with a particular user. Moreover, one or more of the components associated with a particular user may be in communication with one another over a relatively faster, lower latency connection than the connection between different clients 220 or between components associated with different clients 220. For instance, referring to FIG. 2, in one embodiment, CLIENT 1, CLIENT 2, CLIENT N−1 and CLIENT N may be in communication with one another via a wide area network (WAN), such as the Internet. On the other hand, components associated with each respective client 220 communicate with one another over a lower latency connection, such as a local area network (LAN), an internal system bus, combinations of the same or the like, depending on the configuration. For instance, CLIENTS 1, 2 and N having media agents 270 residing thereon may communicate with their corresponding media agents 270 via an internal bus. The media agent 270 associated with CLIENT N−1, on the other hand, may reside on a separate computing device, and CLIENT N−1 and its associated media agent 270 may therefore communicate over a LAN, some other network connection, or an external bus interface such as a Universal Serial Bus (USB) interface.

Data agent 240 may be the same or similar to the data agents 142 described with respect to FIGS. 1C-1E, and may be a software module that is generally responsible for archiving, migrating, and recovering data of a client computer 220 stored in an information store or other memory location. Each client computer 220 can have at least one data agent 240 and the storage system 200 can support many client computers 220. The storage system 200 provides a plurality of data agents 240 each of which is intended to backup, migrate, and recover data associated with a different application. For example, different individual data agents 240 may be designed to handle Microsoft Exchange™ data, Microsoft Windows file system data, and other types of data known in the art. If a client computer 220 has two or more types of data, one data agent 240 may be implemented for each data type to archive, migrate, and restore the client computer 220 data.

A shared storage pool 260 generally includes one or more clients 220 that contribute storage resources to the pool, and that are thus accessible for data storage operations involving source data generated by the other clients 220. Thus, some or all of the space in the storage devices 280 associated with the clients 220 in the shared storage pool 260 may be available to other clients 220 in the storage pool 260 for secondary storage operations, such as, without limitation, backup, archive or snapshot operations. FIG. 2 illustrates n number of clients 220. Each client 220 may have one or more associated storage devices 280. For example, clients 1 and 2 each have one storage device 280, and client n−1 has two storage devices 280. Each client 220 may have at least one data agent 240 and at least one media agent 270 installed thereon. While the data agent 240 and media agent 270 are shown as residing on the clients 220, the data agent 240 and/or media agent 270 may instead reside on a separate computing device from the client 220. As indicated previously, data in some cases is be sent directly between the clients 220 without passing through the storage manager 210. This can help avoid a communication bottleneck and can therefore help improve throughput. This arrangement may also be advantageous for security and privacy reasons, as it may be desirable for the users of the client computers 220 to avoid having their data made accessible by the storage manager 210. In one alternative embodiment, the at least some data passes through the storage manager 210 on the path from a source client to a target client during a storage operation.

In some embodiments, the share list 290 for a client defines the storage resources in the pool available to that client for data storage operations, such as secondary copy operations (e.g., backups, archives or snapshots). Thus, whether a client 220 can utilize the storage resources of another client 220 may be determined based on a share list 290 for the client 220. For example, the share list for client 1 includes clients n−1 and n. Client 1 may back up its data to client n−1 and/or client n, but client 1 may not back up its data to client 2. Once the data is successfully backed up to another client 220, the client that requested backup may restore its data from the client(s) 220 where its data is stored. The data may be stored on the client 220 machine (e.g., on a hard drive or other storage device within a laptop or other computing device) or storage device(s) 280 associated with that client 220. The shared storage pool 260 will be discussed in more detail with respect to FIGS. 3-7.

A backup module 250 generally manages storage operations (e.g., backups or other secondary copy operations) among the clients 220 in the shared storage pool 260. The backup module 250 may create and maintain the share list 290 for the clients 220. The backup module 250 may determine parameters relating to backup and send them to clients 220 requesting backup. The parameters relating to storage operation, such as identifier(s) indicating the storage resources involved in the storage operation (e.g., a backup operation), and the like, may be determined based on the share list 290 and/or the client configuration information 291. The backup module 250 also may keep track of information regarding the storage operations, which may be in the form of an index 292 of jobs. In response to restore requests from clients 220, the backup module 250 may determine and send parameters relating to restore to the requesting clients 220. The backup module 250 may communicate with the clients 220 within the storage pool 260 via a network. In some embodiments, the backup module 250 is a software module that forms a part of or resides on the storage manager 210 or, alternatively, the media agents 270. The backup module 250 can additionally be a software module executing on one or more of the client computers 220. In some embodiments, the backup module 250 may be implemented as a part of the data agent 240. The backup module 250 will be discussed in more detail with respect to FIGS. 3-7.

Generally speaking, storage manager 210 may be the same or similar to the storage managers 140 described with respect to FIGS. 1C-1E, and can be software module or application that coordinates and controls the system. The storage manager 210 communicates with all elements of the storage system 200 including the client computers 220, data agents 240, the media agents 270, and the storage devices 280, to initiate and manage system backups, migrations, recoveries, and the like. The storage manager 210 can be located within the client 220, the media agent 270, or can be a software module within a separate computing device. In other words, the media agent 270 and/or the client 220 can include a storage manager module. In one embodiment, the storage manager 210 is located in close proximity to the client 220 and communicates with the client 220 via a LAN. In another embodiment, the storage manager 210 communicates with the client 220 via a WAN. Similarly, in one embodiment, the storage manager 210 communicates with the media agent 270 via a LAN, and in another embodiment communicates with the media agent 270 via a WAN.

The storage manager 210 can also deduplicate the data that is being backed up in storage device 280. For example, the storage manager 210 can analyze individual data blocks being backed up, and replace duplicate data blocks with pointers to other data blocks already stored in the storage device 280. To identify duplicate data blocks, the storage manager 210 can perform hash functions, on each data block. The hash functions of the different data blocks can be compared. Matching hashes of different data blocks can indicate duplicate data, which can be replaced with a pointer to previously stored data. Additional detail regarding deduplicating data is provided in the applications incorporated by reference herein. Other components of storage system 200 can perform the deduplication techniques on the data blocks, such as the media agent 270, the client 220, and/or the storage device 280.

A media agent 270 may be the same or similar to the media agents 144 described with respect to FIGS. 1C-1E. The media agent 270 is generally a software module that conducts data, as directed by the storage manager 210, between locations in the storage system 200. For example, the media agent 270 may conduct data between the client computer 220 and one or more storage devices 280, between two or more storage devices 280, etc. Although not shown in FIG. 2, one or more of the media agents 270 can also be communicatively coupled to one another. In some embodiments, the media agent 270 communicates with the storage manager 210 via a LAN or SAN. In other embodiments, the media agent 270 communicates with the storage manager 210 via a WAN. The media agent 270 generally communicates with the storage devices 280 via a local bus. In some embodiments, the storage device 280 is communicatively coupled to the media agent(s) 270 via a Storage Area Network ("SAN").

The storage devices 280 can include a tape library, a magnetic media storage device, an optical media storage device, or other storage device. The storage devices 280 can further store the data according to a deduplication schema as discussed above. The storage devices 280 can also include a signature block corresponding to each stored data block.

Further embodiments of storage systems such as the one shown in FIG. 2 are described in application Ser. No. 10/818,749, now U.S. Pat. No. 7,246,207, issued Jul. 17, 2007, which is hereby incorporated by reference in its entirety. In various embodiments, components of the storage system may be distributed amongst multiple computers, or one or more of the components may reside and execute on the same computer.

Furthermore, components of the storage system of FIG. 2 can also communicate with each other via a computer network. For example, the network may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like.

Additionally, the various components of FIG. 2 may be configured for deduplication. For example, one or more of the clients 220 can include a deduplicated database (DDB). The data stored in the storage devices 280 may also be deduplicated. For example, one or more of the media agents 270 associated with the respective storage devices 280 can manage the deduplication of data in the storage devices 280.

An Example Data Storage System for Backup Using Social Networking

Figure 3:
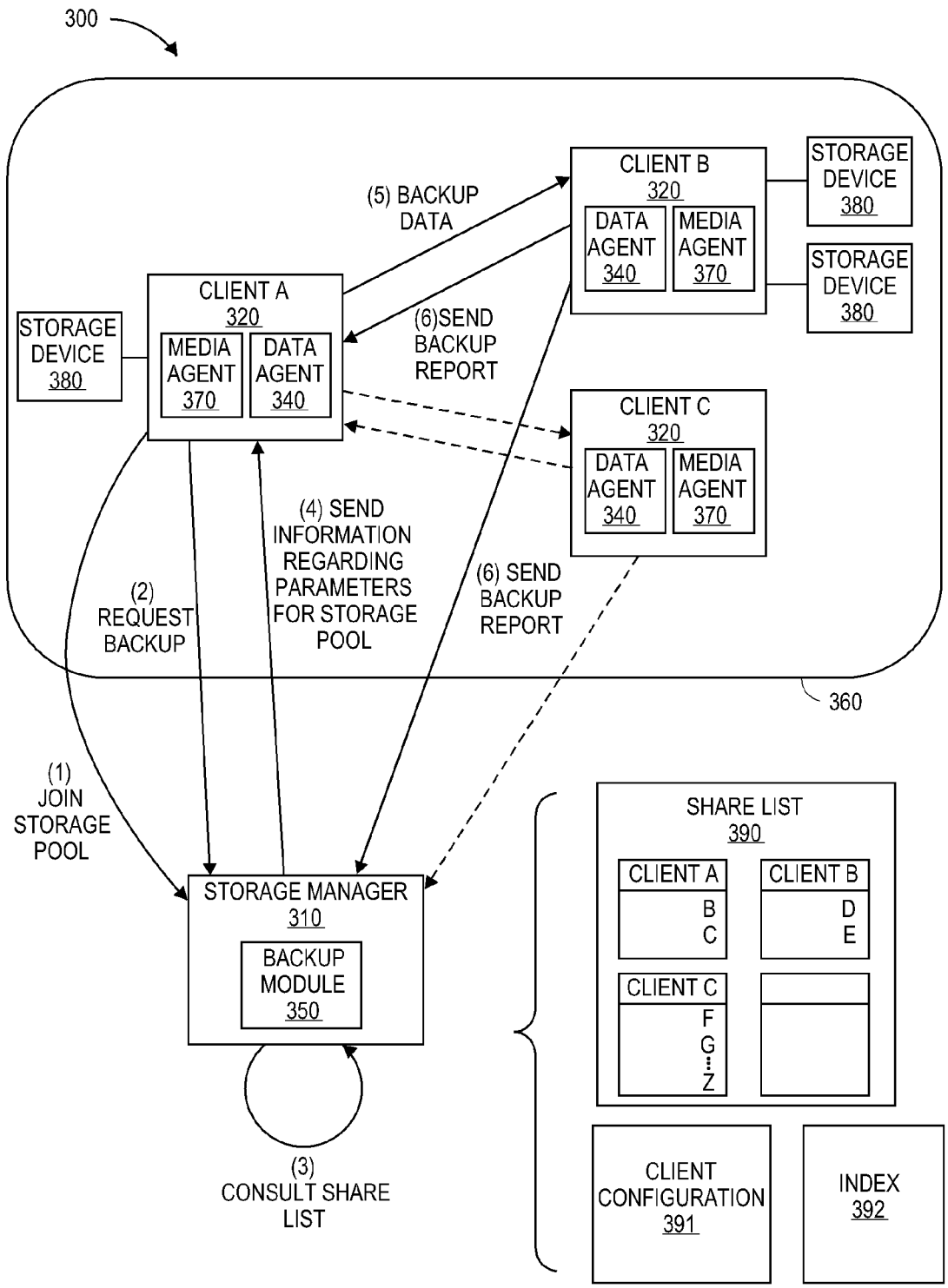
FIG. 3 is a data flow diagram illustrative of the interaction between the various components of an example storage system configured to implement data protection operations using a shared, on-line pool of data storage resources, according to certain embodiments.

FIG. 3 is a data flow diagram illustrative of the interaction between the various components of an example data storage system 300 configured to implement backup using a shared, on-line pool of data storage resources according to certain embodiments. As illustrated, the example storage system 300 includes a storage manager 310, one or more clients 320, one or more data agents 340, a backup module 350, a shared storage pool 360, one or more media agents 370, and one or more storage devices 380. The storage manager 310, the client 320, the data agent 340, the backup module 350, the storage pool 360, the media agent 370, and the storage device 380 can be similar or the same as the storage manager 210, the client 220, the data agent 240, the backup module 250, the storage pool 260, the media agent 270, and the storage device 280 in FIG. 2. Although not shown, there may be a different information store associated with each of the clients 320. The system 300 may include one or more of each component. All components of the system 300 can be in direct communication with each other or communicate indirectly via the client 320, the storage manager 310, the media agent 370, or the like. In certain embodiments, some of the components in FIG. 3 shown as separate components can reside on a single computing device. For example, the backup module 350 can be on the storage manager 310 or on a separate computing device.

With further reference to FIG. 3, the interaction between the various components of the example data storage system 300 configured to implement data protection operations using a shared, on-line pool of data storage resources will now be described in greater detail with respect to data flow steps indicated by the numbered arrows. While described with respect to a backup copy operation to simplify the discussion, other types of storage operations (e.g., archive operations, snapshot operations, etc.) are also compatible. For illustration purposes, a client 320 requesting backup may be referred to as "requesting client," and a client 320 where data is backed up may be referred to as "backup client." Moreover, where data is referred to as being backed up to a client, this can refer to the data being stored in the storage device(s) 380 associated with that client.

At data flow step 1, a user associated with a client 320 joins the shared storage pool 360, for example, by registering with or signing up with the storage manager 310 (e.g., via a web interface or a portal). For instance, the storage manager may create and maintain an account associated with the user. When joining the storage pool 360, a user associated with the client 320 may enter information for a share list 390 associated with the client 320. A share list 390 may identify one or more clients 320 that are known to or otherwise associated with the client 320. The clients 320 included in the share list 390 may serve as candidates for backup location. The backup module 350 may maintain the share list 390 for each client 320 in the storage pool 360. The backup module 350 may create the share list 390 for the client 320 joining the storage pool 360 and store the information entered by the client 320 in the share list 390. The backup module 350 may also add information regarding the client 320 to the client configuration information 391. The client configuration information 391 will be explained in more detail with respect to data flow step 3. Upon joining the storage pool 360, the user may install the data agent 340 and the media agent 370. The data agent 340 and the media agent 370 may be downloaded from a user interface (UI) provided by the storage manager 310.

In a specific example relating to FIG. 3, Client A joins the storage pool 360 by sending a request to the storage manager 310. When joining the storage pool 360, the user associated with Client A may be asked to enter information for its share list 390. Such information can include clients 320 associated with Client A. The user associated with Client A indicates Clients B and C as the clients 320 to be added to its associated share list 390. The backup module 350 creates a share list 390 for Client A and adds Clients B and C to the share list 390. Alternatively, the storage manager 310 may provide a default share list 390, e.g., if the user does not provide the information to add to the share list 390 for the client 320. The storage manager 310 may also assign default friends for the share list 390 based on a number of factors. Such factors may include geographic proximity (e.g., time zone) and storage utilization. For example, the storage manager 310 may assign clients 320 and/or their associated storage devices 380 that have relatively low storage utilization as compared to other clients 320 and/or associated storage device 380 as default friends. The backup module 350 may also add information about Client A to the client configuration information 391. The user for Client A then downloads and installs the data agent 340 and the media agent 370.

A user associated with a client 320 in the storage pool 360 may contribute storage resources to the storage pool 360 in a number of ways. A user may provide storage space associated with storage devices located within the user's client 320 machine (e.g., a laptop hard drive or solid state drive). Or a user may provide additional storage devices 380 (e.g., external to the client 320), which can be accessed via the client 320. Additional storage devices 380 may be easily added to the storage pool 360 by installing a media agent 370 directly on the storage devices 380 or on separate computing devices that are in communication with the storage devices 380. In some embodiments, a user may be allowed to use the same amount of storage resource as the amount the user provides. In other embodiments, a user may contribute resources to the pool 360 without utilizing any storage. In certain embodiments, a user may not contribute any storage and pay a fee to use storage from the pool 360. If a user contributes resources, the user may not pay any fees or pay a pro-rated fee based on the amount of resources the user contributes.

At data flow step 2, the client 320 sends a request to the storage manager 310 to perform a backup operation. After a client 320 joins the storage pool 360, the client 320 may back up data to other clients 320 on its share list 390. The client 320 may initiate backup by sending a backup request to the storage manager 310. Alternatively, the storage manager 310 may initiate backup without a request from the client 320, e.g., according to a storage policy for the client 320. A user associated with the client 320 may set up preferences and configurations for backup operations with the storage manager 310 (e.g., from the storage manager 310 GUI), and the storage manager 310 may initiate backup (or another type of secondary copy) according to the user configurations. For example, backup may occur according to a storage policy or a schedule. In some embodiments, the data agent 340 may send a request for backup to the storage manager 310.

At data flow step 3, the backup module 350 consults the share list 390 for the requesting client 320 in order to determine where data should be backed up. As explained above, the share list 390 may include clients 320 whose identities are known to the requesting client 320, or clients 320 that are otherwise associated with the requesting client 320. For example, the share list 390 may be based on friends of a user in a social networking website. In some embodiments, the share list 390 is based on the Friends list in Facebook. In such embodiments, Client A may be friends with Clients B and C on Facebook.

The backup module 350 may select a backup client 320 from the share list 390 of the requesting client 320. In FIG. 3, the backup module 350 may select Client B or C (or both) as backup location(s) for Client A by referring to the share list 390 for Client A. The backup module 350 may also refer to the client configuration information 391 in selecting the backup client 320. The client configuration information 391 may include the following information for some or all of the clients in the on-line storage pool 360, without limitation: type of storage device associated with a client 320, type of processor or other hardware associated with a client 320, type or number of data agent(s), media agent(s) or other software components installed on or associated with a client 320, amount of storage resources contributed to the pool that is associated with the client 320, user feedback, etc. Data can be backed up to the client 320 machine itself (e.g., where the client machine is a laptop, to a hard drive of the laptop) or storage devices 380 associated with the client 320 (e.g., external to the client 320). Thus, the client configuration information 391 may include information about the client 320 machine or the storage devices 380 associated with the client 320. The data structures for the client configuration information 391 will be explained in more detail with respect to FIG. 5.

Data of a requesting client 320 can be backed up to a single client 320 or may be distributed across multiple clients 320. Accordingly, the backup module 350 may select one or more backup clients 320 from the share list 390. For example, Client A can back up its data to only Client B or only Client C. Alternatively, Client A may back up its entire data to both Clients B and C. Or Client A may back up a part of its data to Client B and the rest of its data to Client C.

As explained above, the data of a requesting client 320 can be backed up to the client 320 machine (e.g., a laptop) and/or the storage devices 380 provided by the client 320. As such, a client 320 can incorporate additional storage devices 380 in order to increase space available for backup. In some embodiments, a client 320 in the storage pool 360 may act as a storage provider by providing a number of storage devices 380. A client 320 can install a media agent 370 either on the client 320 or on separate computing devices, and data to be backed up can be conducted via the media agent 370 to the storage devices 380. The data may be backed up to any combination of storage provided by the client 320 machine and storage devices 380. For instance, the data may only be written to storage within the client machine 320, or only to a storage device 380, that may be external to but coupled to the client machine 320. Or the data may be written to the client machine 320 and one or more storage devices 380.

For example, a particular user associated with a particular client may have a relatively large number of "friends" on his or her share list 390. The user may decide to purchase additional storage devices 380 so that he or she can act as a storage provider to the large number of friends in the pool. The user may charge or otherwise be compensated for use of his or her storage resources. For instance, the user may be compensated based on the amount of storage resources contributed to the pool and/or based on the utilization of that user's storage resources. Moreover, the entity that provides management and administration services for backup in the storage pool 360, e.g., the entity that provides the storage manager 310 and/or the backup module 350, may take a percentage of the fees in return for administering the pooled storage system.

In some embodiments, storage resources associated with a client 320 in the shared storage pool 360 may include cloud storage and may, e.g., be provided by a cloud vendor. In other embodiments, a client 320 may be a data center. In these embodiments, the requesting client 320 may have the option to choose to back up to client(s) 320 on its share list 390 or to back up to the cloud storage or the data center. Or, in some cases, the cloud storage or data center may be added to the share list 390.

As discussed above, the backup module 350 can determine the backup client(s) 320 for the requesting client 320 based on a number of factors, including the share list 390 for the requesting client 320 and the client configuration information 391.

At data flow step 4, the backup module 350 sends information regarding parameters for the storage pool 360 to the requesting client 320. The information sent to the requesting client 320 may include a list of one or more backup clients 320, and type of storage and processor associated with these selected clients 320. In some embodiments, the requesting client 320 may select a backup client 320 from a list of candidate backup clients 320 based on the information sent by the backup module 350. For example, Client A, the requesting client 320, may indicate in its backup request that it wants to back up its data across multiple clients 320. The backup module 350 may include Clients B and C as backup clients 320 in the information sent to Client A. However, Client A may decide not to back up data to Client B if it does not find Client B adequate based on the type of storage and processor information. In some embodiments, the user may pre-configure preferences for parameters relating to backup (e.g., using the storage manager 310 GUI), rather than doing it on a backup-by-backup basis.

The storage manager 310 may implement logic to determine which storage devices to choose as backup clients 320. Such determination may be based on a number of factors, such as amount of available storage capacity, availability of clients, utilization rate of contributed storage resources, user feedback, geographic proximity, etc. For instance, the storage manager 310 may select clients 320 in the share list based on the amount of available storage capacity provided by each client 320. The storage manager 310 may also select clients 320 in the share list based on availability, where storage devices of friends who are currently or historically off-line (e.g., shut down their PC at night) are less likely to be selected than storage resources of friends who are generally available. The storage manager 310 may also select clients 320 in the share list with relatively low utilization rates. Users may provide feedback regarding various clients 320, and the storage manager 310 may select clients 320 based on the user-generated feedback and ratings. The storage manager 310 may also select clients 320 based on geographic location, e.g., a location farther than a certain distance. A user may also choose a specific backup client 320, e.g., by overriding all the factors.

At data flow step 5, the requesting client 320 backs up data to one or more backup clients 320. For example, the media agent 370 associated with the backup client 320 is assigned by the storage manager 310 to convey the data to contributed storage resources associated with the backup client 320. The storage resources can include one or more of the storage devices 380, or a storage device residing on the client 320 itself, such as an integrated hard drive or solid state drive. As an example, where the backup client is CLIENT B, the media agent 370 residing on CLIENT B may be assigned to convey the data to one or more of the storage devices 380 associated with CLIENT B. While the media agent 370 associated with (e.g., residing on or local to) the backup client 320 may be assigned to convey the backup data to the storage devices 380 of the backup client 320 (or other storage resources of the backup client 320), in some other embodiments, a different media agent 370 in the pool 360 may be selected. For instance, where CLIENT B is the backup client 320, the storage manager 310 may assign a media agent 370 associated with CLIENT C (e.g., residing on or local to CLIENT C) to convey the data to the appropriate contributed storage resources associated with CLIENT B (e.g. the storage device(s) 380). Selection of the media agent 370 may be based on media agent availability, network utilization or bandwidth, or some other appropriate criteria. When data is backed up to more than one client 320, backup to multiple clients 320 may occur in parallel in order to reduce the amount of time for backup. Backup can occur according to a storage policy or a schedule. For example, backup at the requesting client 320 may be scheduled for every Sunday at 2 am. Or in another example, the requesting client 320 may be a laptop, and backup may run every time the requesting client 320 is connected to a power source. This type of backup may be referred to as "opportunistic scheduling." Opportunistic scheduling may also depend on the availability of the backup client 320. For example, the backup client 320 may not be available at the time the requesting client 320 requests backup (e.g., according to a schedule). In such case, the backup module 350 or the requesting client 320 may monitor the availability of the backup client 320 and initiate backup at a later time when the backup client 320 becomes available. For example, Client A may be scheduled to back up its data each night to Client B, which is a laptop. However, the user associated with Client B may often shut down the laptop at night. The backup module 350 or Client A may monitor the status of Client B, and the backup can start when Client B is back online.

Data to be backed up may be encrypted to protect the information. Data to be backed up can also be deduplicated to save storage space in the backup client 320 and reduce backup time. The media agent 370 may deduplicate the data to be backed up. Data to be backed up may be sent directly from the requesting client 320 to the backup client 320 without being sent through the storage manager 310 and/or the backup module 350. In this manner, the storage manager 310 and/or the backup module 350 may act as an exchange or a broker for backup by connecting the requesting client 320 and backup client(s) 320 without handling the data.

At data flow step 6, the backup client 320 sends a backup report to the requesting client 320 and/or the storage manager 310. For instance, once the backup completes or fails, the backup client 320 may send status information relating to the backup to the requesting client 320. Status information may indicate whether the backup was successful or not. The backup report may also be sent to the requesting client 320 at later times subsequent to the backup to inform the requesting client 320 that the data backed up on a specific date is available. For example, the backup client 320 may send a verification report each day after the backup to inform the requesting client 320 whether the backed up data is available for restore.

Same or similar information may also be sent to the storage manager 310. The storage manager 310 or the backup module 350 may maintain records of the backup operations so that when a client 320 requests restore of the backed up data, the storage manager 310 or the backup module 350 can indicate where data may be restored from. Backup operations can be stored in an index 392 of backup jobs. The index 392 may also maintain records of restore jobs. The index 392 may include information like type of job, requesting client, backup/restore location, status, etc. The data structures for the index 392 will be explained in more detail with respect to FIG. 5.

As explained above, the backup module 350 provides management and administration services relating to backup between clients 320 within a shared storage pool 360 and acts as an intermediary between the clients 320 for backup. In this manner, the shared storage pool 360 provides readily available storage to clients 320 in the pool, and from the perspective of the user associated with the individual clients, the backup process is relatively streamlined since the backup module 350 oversees the management of the backup/restore operations. In addition, because each user can enter the information for his or her share list 390, users can control and know in advance the identities of clients 320 where their data may be stored. Accordingly, a share list based storage pool can add an extra layer of security for protection of user data.

The shared storage pool 360 can include a variety of types of clients 320. For instance, client computing machines 320 can include any type of appropriate computing device including laptops, desktops, mobile devices, etc., and the client devices 320 and/or associated storage devices 380 may be located in user's residences, corporate offices, or any other suitable location. The example storage system 300 may also be used in an enterprise context. Clients 320 may be added to a shared storage pool 360, and data may be backed up to clients 320 within the pool 360. For instance, a corporation that has a headquarter located in New York and a branch office located in Texas may decide to back up data generated by clients in the New York location to clients 320 in the Texas branch office, and/or vice versa. The clients 320 in New York and Texas may form part of a shared storage pool 360 for the corporation, for example. Such backup may be performed to comply with legal requirements, e.g., a corporation may be required to keep copies of data in a geographically remote area from the headquarter location. A client 320 within the enterprise shared storage pool 360 may also be a data center or cloud storage. A data center or cloud storage can easily be added to the storage pool 360, for example, by installing the data agent 340 and the media agent 370 on the client 320. The enterprise shared storage pool 360 may also operate based on share lists 390 for clients 320.

Figure 4:
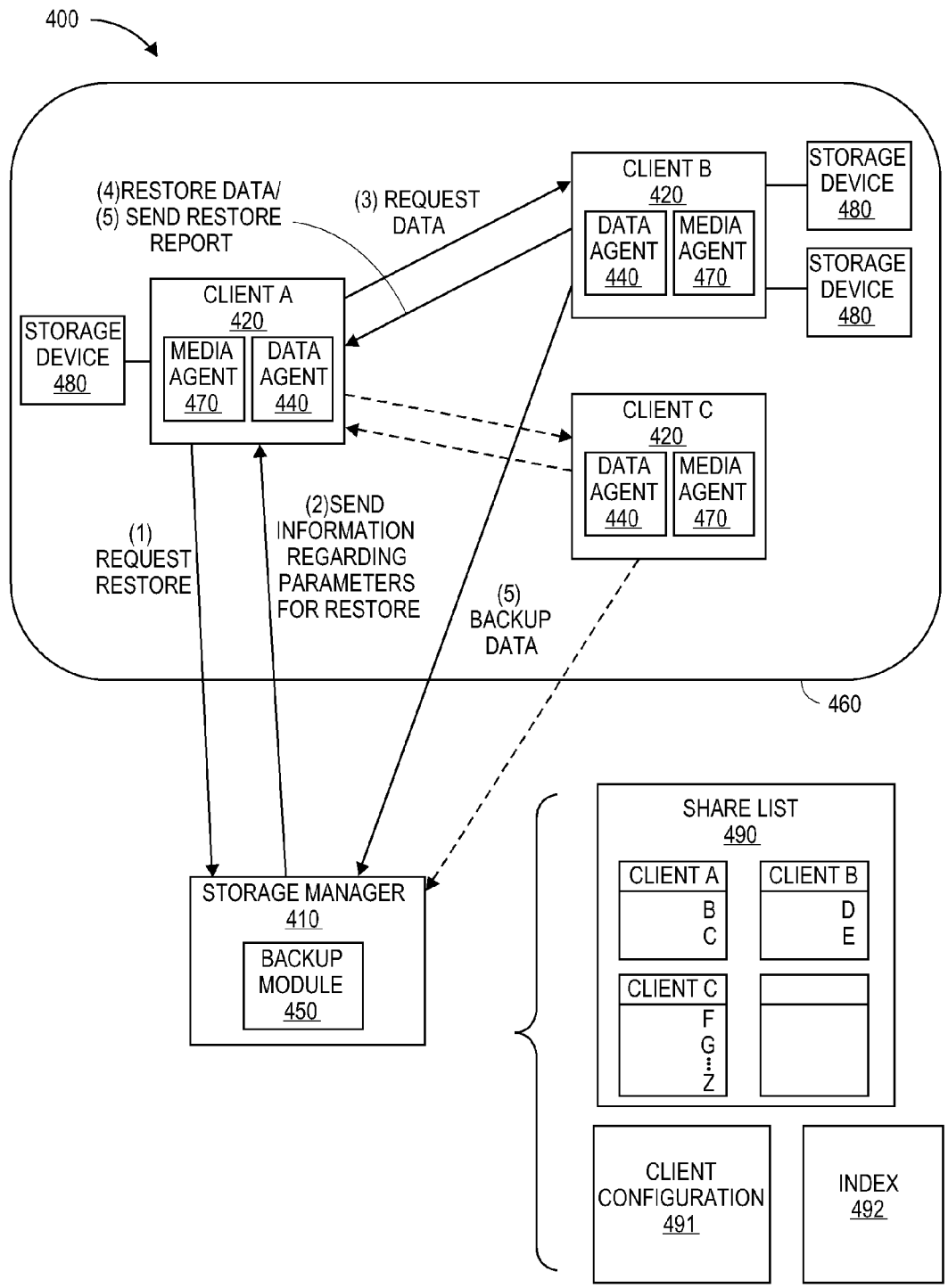
FIG. 4 is a data flow diagram illustrative of the interaction between the various components of an example storage system configured to implement data protection operations using a shared, on-line pool of data storage resources, according to certain embodiments.

FIG. 4 is a data flow diagram illustrative of the interaction between the various components of an example data storage system 400 configured to implement data protection operations using a shared, on-line pool of data storage resources according to certain embodiments. As illustrated, the example storage system 400 includes a storage manager 410, one or more clients 420, one or more data agents 440, a backup module 450, a storage pool 460, one or more media agents 470, and one or more storage devices 480. The storage manager 410, the client 420, the data agent 440, the backup module 450, the storage pool 460, the media agent 470, and the storage device 480 can be similar or the same as the storage manager 210, 310, the client 220, 320, the data agent 240, 340, the backup module 250, 350, the storage pool 260, 360, the media agent 270, 370, and the storage device 280, 380 in FIGS. 2 and 3. Although not shown, there may be a different information store associated with each of the clients 420. The system 400 may include one or more of each component. All components of the system 400 can be in direct communication with each other or communicate indirectly via the client 420, the storage manager 410, the media agent 470, or the like. In certain embodiments, some of the components in FIG. 4 shown as separate components can reside on a single computing device. For example, the backup module 450 can be on the storage manager 410 or on a separate computing device.

With further reference to FIG. 4, the interaction between the various components of the example data storage system 400 configured to implement data protection operations using a shared, on-line pool of data storage resources will now be described in greater detail with respect to data flow steps indicated by the numbered arrows. While described with respect to restoring a backup copy operation to simplify the discussion, the restore technique is also compatible with other types of secondary copies (e.g., archive copies, snapshot copies, etc.). For illustration purposes, a client 420 requesting restore may be referred to as "requesting client," and a client 420 where data is backed up/restored from may be referred to as "backup client." Moreover, where data is referred to as being backed up to a client, this can refer to the data being stored in the storage device(s) 380 associated with that client.

At data flow step 1, a user associated with a client 420 requests restore to the storage manager 410. After the data of the client 420 has been backed up to one or more backup clients 420, the user may wish to restore the data from the backup client(s) 420. The user may initiate restore by sending a restore request to the storage manager 410, e.g., from the storage manager 410 GUI.

At data flow step 2, the backup module 450 sends information regarding parameters for the restore to the client 420. The backup module 450 may refer to the index 492 that stores data regarding backup and restore jobs to determine, for the particular backup job that is being restored, to which clients 420 the requesting client's 420 data has been backed up. The information sent to the requesting client 420 may include a list of one or more backup clients 420 storing the data of the requesting client 420.

At data flow step 3, the requesting client 420 requests data from the backup client 420. The requesting client 420 may send data requests to one or more backup clients 420 indicated in the parameters for restore sent by the backup module 450. For example, the data of the requesting client 420 may have been backed up in a distributed manner over multiple backup clients 420. In such case, the requesting client 420 may send a data request to each backup client 420. Restore from multiple clients 420 may occur in parallel to reduce the amount of time for the restore. If the entire data of the requesting client 420 was backed up to multiple backup clients 420, the backup module 450 may send information for all backup clients 420 that store the requesting client's 420 data. The requesting client 420 then can choose to restore from one of the multiple backup clients 420.

At data flow step 4, the requesting client 420 restores the data from the backup client 420. If the backup client 420 is available for restore, the requesting client 420 restores its data from the backup client 420. If the backup client 420 is unavailable for some reason, the requesting client 420 may send restore requests to other backup clients 420, or wait and try restoring from this particular backup client 420 at a later time. If the requesting client's 420 data has been backed up to multiple backup clients 420, the requesting client 420 may restore its data in a piecemeal fashion base on availability of the backup clients 420. For example, Client A may restore a first portion of its data from Client B at time $T_1$ and a second portion of its data from Client C at time $T_2$.

At data flow step 5, the backup client 420 sends a restore report to the requesting client 420 and/or the storage manager 410. Once the restore completes or fails, the backup client 420 may send status information relating to the restore to the storage manager 410. Status information may indicate whether the restore was successful or not. The restore report may also be sent to the requesting client 420. The storage manager 410 or the backup module 450 may maintain records of the restore operations, for example, to determine which clients 420 or storage devices 480 often cause problems as the restore source. Restore operations can be stored in the index 492 of jobs, along with backup operations. The index 492 may include information such as type of job, requesting client, backup/restore location, status, etc. The data structures for the index 492 will be explained in more detail with respect to FIG. 5.

FIG. 5 illustrates example data structures that can be used to administer a shared, on-line pool of data storage resources to create and manage secondary copies of data, according to certain embodiments. The client configuration information data structure 591 can include data about each client 320 device and/or storage device(s) 380 associated with each client 320. For example, the client configuration data structure 591 may contain the following information: client, storage device, available space, type of storage, type of processor, availability information, and user feedback and/or ratings. Client may indicate the client 320 name; storage device may indicate the storage device 380 name. Type of storage may indicate information about the model and manufacturer of the client 320 or the associated storage device(s) 380. Available space may be determined based on the type of storage information. For example, the backup module 350 can determine from the manufacturer and model information for a client 320 or a storage device 380 the total available storage provided by that particular device. Alternatively, the available space information may be collected from the clients 320 and may reflect available storage for each client 320 at certain points in time. Availability information may indicate the availability of a client 320 and/or a storage device 380. The availability information may include a current "live" status indicating whether or not the client and/or resources are available at that moment. The availability information may also be historical, based on the availability over a certain period of time. User feedback and/or ratings may include user opinion, comments, scores, etc. relating to various clients 320 and storage devices 380. User feedback may be indicated, e.g., by number of stars, by a numerical score, etc.

The index 592 can include data about backup and restore operations between clients 320 in the storage pool 360. For example, the index 592 may contain the following information: job ID, job type, client, location, and status. Job ID may be the ID for the backup or restore operation. Job type may indicate whether the operation is a backup or a restore. Client may indicate the name of the client 320 that requested the backup or the restore. Location may indicate the client 320 to which data is backed up or from which the data is restored. Status may indicate whether the job was successful or not. Although not shown, the index 592 may also include a date and time associated with the job. For example, the date for a backup job can allow the backup module 450 to determine the most recent backup that is available for restore.

Figure 6:
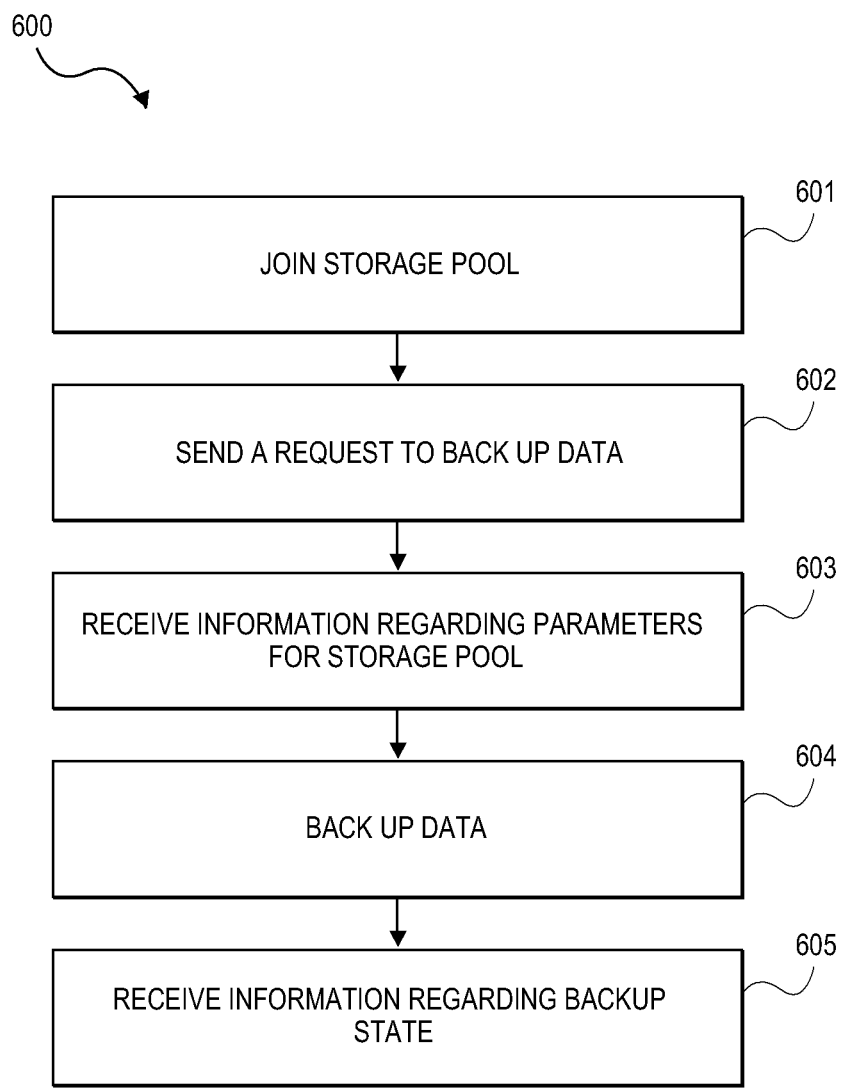
FIG. 6 is a flow diagram illustrative of one embodiment of a routine for utilizing a shared, on-line pool of data storage resources to create secondary copies of data.

FIG. 6 is a flow diagram illustrative of one embodiment of a routine 600 for utilizing a shared, on-line pool of data storage resources to create secondary copies of data. The routine 600 is described with respect to the system 300 of FIG. 3. However, one or more of the steps of routine 600 may be implemented by other data storage systems, such as those described in greater detail above with reference to FIGS. 2 and 4. The routine 600 can be implemented by any one, or a combination of, a client, a storage manager, a data agent, a backup module, a media agent, and the like. Moreover, further details regarding certain aspects of at least some of steps of the routine 600 are described in greater detail above with reference to FIG. 3. Although described in relation to backup operations for the purposes of illustration, the process of FIG. 6 can be compatible with other types of storage operations, such as, for example, archiving, migration, snapshots, replication operations, and the like.

At block 601, a user associated with a client 320 joins the storage pool 360. The user may enter information for a share list 390 associated with the client 320. The client 320 information may be added to the client configuration information 391. The user may install the data agent 340 and the media agent 370 on the client 320 or on separate computing devices.

At block 602, the client 320 sends a request to back up its data to the storage manager 310. The storage manager 310 or the backup module 350 may consult the share list 390 for the requesting client 320 in order to provide information regarding possible backup location(s). The backup module 350 may also refer to the client configuration information 391 to select backup clients 320.

At block 603, the client 320 receives information regarding parameters for the storage pool 360. The parameters for the storage pool 360 may indicate where the client 320 can back up its data and may include a list of candidate backup clients 320.

At block 604, the client 320 backs up the data to one or more backup clients 320. The client 320 may select a backup client 320 from a list of clients 320 in the parameters. The client 320 may choose to back up to one, several, or all backup clients 320 in the list.

At block 605, the client 320 receives information regarding backup state. The backup state information may be sent immediately after the backup operation to indicate whether the backup operation was successful. The backup state information may also be sent at a later time, e.g., at a periodic interval, to indicate whether the data as backed up on a particular date is still available for restore. For example, the backup client 320 may send verification information on a daily basis to notify the requesting client 320 that the data backed up as of mm-dd-yyyy is available.

The routine 600 can include fewer, more, or different blocks than those illustrated in FIG. 6 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Figure 7:
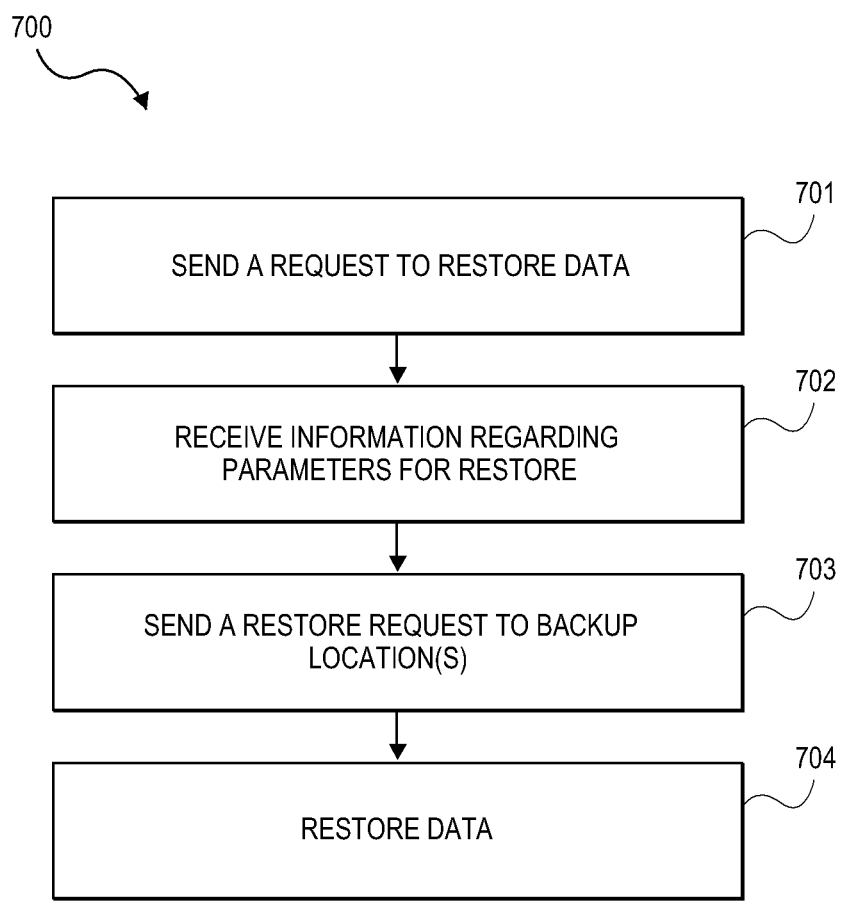
FIG. 7 is a flow diagram illustrative of one embodiment of a routine for utilizing a shared, on-line pool of data storage resources to restore secondary copies of data.

FIG. 7 is a flow diagram illustrative of one embodiment of a routine 700 for utilizing a shared, on-line pool of data storage resources to create secondary copies of data. The routine 700 is described with respect to the system 300 of FIG. 3. However, one or more of the steps of routine 700 may be implemented by other data storage systems, such as those described in greater detail above with reference to FIGS. 2 and 4. The routine 700 can be implemented by any one, or a combination of, a client, a storage manager, a data agent, a backup module, a media agent, and the like. Moreover, further details regarding certain aspects of at least some of steps of the routine 700 are described in greater detail above with reference to FIG. 3. Although described in relation to backup operations for the purposes of illustration, the process of FIG. 7 can be compatible with other types of storage operations, such as, for example, archiving, migration, snapshots, replication operations, and the like.

At block 701, a user associated with a client 320 sends a request to restore data to the storage manager 310. At block 702, the client 320 receives information regarding parameters for restore from the storage manager 310. The storage manager 310 or the backup module 350 may consult the index 392 of jobs to determine the restore location(s). The parameters may include a list of backup clients 320 that store the requesting client's 320 data.

At block 703, the client 320 sends a restore request to backup location(s). The client 320 may send the restore request to multiple backup clients 320, e.g., if its data is stored across more than one client 320 in a distributed manner. At block 704, the client 320 restores the data from one or more backup clients 320.

The routine 700 can include fewer, more, or different blocks than those illustrated in FIG. 7 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

Storage operations compatible with embodiments described herein will now be described. For example, data can be stored in primary storage as a primary copy or in secondary storage as various types of secondary copies including, as a backup copy, a snapshot copy, a hierarchical storage management copy ("HSM"), an archive copy, and other types of copies. Certain embodiments described herein with respect to backup operations are similarly compatible with each of these types of operations.

A primary copy of data according to some embodiments is a production copy or other "live" version of the data which is used by a software application and is generally in the native format of that application. Such primary copy data is typically intended for short term retention (e.g., several hours or days) before some or all of the data is stored as one or more secondary copies, such as, for example, to prevent loss of data in the event a problem occurred with the data stored in primary storage.

Secondary copies can include point-in-time data and are typically intended for long-term retention (e.g., weeks, months or years) before some or all of the data is moved to other storage or is discarded. Secondary copies may be indexed so users can browse and restore the data at another point in time. After certain primary copy data is backed up, a pointer or other location indicia such as a stub may be placed in the primary copy to indicate the current location of that data.

One type of secondary copy is a backup copy. A backup copy in some embodiments is a copy of production data and, in some embodiments, can be stored in a backup format, e.g., as opposed to a native application format. For example, a backup copy may be stored in a backup format that facilitates compression and/or efficient long-term storage. Backup copies generally have relatively long retention periods and may be stored on media with slower retrieval times than other types of secondary copies and media. In some cases, backup copies may be stored at on offsite location.

Another form of secondary copy is a snapshot copy. From an end-user viewpoint, in some embodiments, a snapshot may be thought of as an instant image of the primary copy data at a given point in time. A snapshot generally captures the directory structure of a primary copy volume at a particular moment in time and may also preserve file attributes and contents. In some embodiments, a snapshot may exist as a virtual file system, parallel to the actual file system. Users typically gain read-only access to the record of files and directories of the snapshot. By electing to restore primary copy data from a snapshot taken at a given point in time, users may also return the current file system to the state of the file system that existed when the snapshot was taken.

A snapshot in some cases is created substantially instantly, using a minimum amount of file space, but may still function as a conventional file system backup. Some types of snapshots do not actually create another physical copy of all the data, but may simply create pointers that are able to map files and directories to specific disk blocks.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of copy-on-write snapshots, when a block changes in primary storage, the block is copied to secondary storage before the block is overwritten in primary storage. The snapshot mapping of file system data is also updated to reflect the changed block(s) at that particular point in time.

An HSM copy can be a copy of the primary copy data but typically includes only a subset of the primary copy data that meets a certain criteria and is usually stored in a format other than the native application format. For example, an HSM copy may include data from the primary copy that is larger than a given size threshold or older than a given age threshold and that is stored in a backup format. Often, HSM data is removed from the primary copy, and a stub is stored in the primary copy to indicate the new location of the HSM data. When a user requests access to the HSM data that has been removed or migrated, systems use the stub to locate the data and often make recovery of the data appear transparent, even though the HSM data may be stored at a location different from the remaining primary copy data.

An archive copy according to some embodiments is generally similar to an HSM copy. However, the data satisfying criteria for removal from the primary copy is generally completely removed with no stub left in the primary copy to indicate the new location (i.e., where the archive copy data has been moved to). Archive copies of data are sometimes stored in a backup format or other non-native application format. In addition, archive copies are generally retained for very long periods of time (e.g., years) and, in some cases, are never deleted. In certain embodiments, such archive copies may be made and kept for extended periods in order to meet compliance regulations or for other permanent storage applications.

In some embodiments, application data over its lifetime moves from more expensive quick access storage to less expensive slower access storage. This process of moving data through these various tiers of storage is sometimes referred to as information lifecycle management ("ILM"). This is the process by which data is "aged" from forms of primary storage with faster access/restore times down through less expensive secondary storage with slower access/restore times. For example, such aging may occur as data becomes less important or mission critical over time.

Similar data transfers associated with location-specific criteria are performed when restoring data from secondary storage to primary storage. For example, to restore data a user or system process generally must specify a particular secondary storage device, piece of media, or archive file. Thus, the precision with which conventional storage management systems perform storage operations on electronic data is generally limited by the ability to define or specify storage operations based on data location.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method of creating secondary copies of data associated with user computing devices in a shared storage pool, comprising:
 using one or more computing devices comprising computer hardware:

receiving instructions to create a secondary copy of first data stored in primary storage associated with a first computing device in a networked pool of computing devices;

in response to the instructions to create the secondary copy of the first data, accessing a data structure associated with the first computing device that identifies a first subset of computing devices in the pool that are designated for sharing storage resources with the first computing device, wherein the remaining computing devices in the pool that are not in the subset are not designated for sharing storage resources with the first computing device;

instructing, by a storage manager residing on first computer hardware, the first computing device to transmit the first data to a first media agent residing on second computer hardware and associated with at least one computing device in the pool and which creates the secondary copy of the first data in storage resources associated with a second computing device in the pool that is included in the first subset;

receiving instructions to create a secondary copy of second data stored in primary storage associated with a third computing device in the pool;

in response to the instructions to create the secondary copy of the second data, accessing a data structure associated with the third computing device that identifies a second subset of computing devices in the pool that are designated for sharing storage resources with the third computing device, the second subset including the first computing device; and instructing, by the storage manager, the third computing device to transmit the second data to a second media agent residing on third computer hardware and associated with at least one computing device in the pool and which creates the secondary copy of the second data in storage resources associated with the first computing device.

2. The method of claim 1, further comprising electronically distributing common data protection software to the plurality of computing devices for installation thereon, the common data protection software configured to manage the creation of the secondary copies.

3. The method of claim 2, wherein the common data protection software comprises data agent software and media agent software, wherein said first and second media agents are installed instances of the media agent software, and wherein said first, second, and third computing devices include installed instances of the data agent software.

4. The method of claim 1, wherein the computing devices in the pool are in communication with one another over a wide area network (WAN).

5. The method of claim 4, wherein the computing devices in the pool are in communication with one another over the Internet.

6. The method of claim 1, further comprising, prior to said instructing the first computing device to transmit the first data:
determining an availability of the storage resources associated with the computing devices in the first subset; and
based at least in part on the determined availability, deciding to create the secondary copy of the first data in the storage resources associated with the second computing device.

7. The method of claim 1, further comprising determining whether the first computing device is available for use in restoring the secondary copy of the second data.

8. The method of claim 7, further comprising compiling a report including an entry indicating the determined availability of the first computing device.

9. The method of claim 1, wherein neither of the first data or the second data are transmitted to the storage manager in performance of the method.

10. The method of claim 1, wherein the first data comprises production data generated by one or more software applications executing on the first computing device and the second data comprises production data generated by one or more software applications executing on the third computing device.

11. The method of claim 1, wherein the second computing device includes the second computer hardware, and the first computing device includes the third computer hardware.

12. A system for creating secondary copies of data associated with user computing devices in a shared storage pool, the system comprising:
a first data structure associated with a first computing device in a networked pool of computing devices and listing a first subset of computing devices in the pool that are designated for sharing storage resources with the first computing device;
a second data structure associated with a third computing device in the pool and listing a second subset of computing devices in the pool that are designated for sharing storage resources with the third computing device, the second subset including the first computing device; and
first computer hardware comprising a storage manager residing thereon, the storage manager configured to:
receive instructions to create a secondary copy of first data stored in primary storage associated with the first computing device;
in response to the instructions to create the secondary copy of the first data, access the first data structure to identify the first subset of computing devices in the pool, wherein the remaining computing devices in the pool that are not in the subset are not designated for sharing storage resources with the first computing device;
instruct the first computing device to transmit the first data to a first media agent residing on second computer hardware and associated with at least one computing device in the pool which creates the secondary copy of the first data in storage resources associated with a second computing device;
receive instructions to create a secondary copy of second data stored in primary storage associated with the third computing device;
in response to the instructions to create the secondary copy of the second data, access the second data structure to identify the second subset of computing devices in the pool; and
instruct the third computing device to transmit the second data to a second media agent residing on third computer hardware and associated with at least one computing device in the pool which creates the secondary copy of the second data in storage resources associated with the first computing device.

13. The system of claim 12, wherein the storage manager is further configured to electronically distribute common data protection software to the plurality of computing devices for installation thereon, the common software configured to manage the creation of the secondary copies.

14. The system of claim 13, wherein the common data protection software comprises data agent software and media agent software, wherein said first and second media agents are installed instances of the media agent software, and wherein said first, second, and third computing devices include installed instances of the data agent software.

15. The system of claim 12, wherein the computing devices in the pool are in communication with one another over a wide area network (WAN).

16. The method of claim 15, wherein the computing devices in the pool are in communication with one another over the Internet.

17. The method of claim 12, wherein the storage manager is further configured to, prior to instructing the first computing device to transmit the first data:
   determine an availability of the storage resources associated with the computing devices in the first subset; and
   based at least in part on the determined availability, decide to create the secondary copy of the first data in the storage resources associated with the second computing device.

18. The system of claim 12, wherein the storage manager is further configured to determine whether the first computing device is available for use in restoring the secondary copy of the second data.

19. The system of claim 18, wherein the storage manager is further configured to compile a report including an entry indicating the determined availability of the first computing device.

20. The system of claim 12, wherein neither of the first data or the second data are transmitted to the storage manager.

21. The system of claim 12, wherein the first data comprises production data generated by one or more software applications executing on the first computing device and the second data comprises production data generated by one or more software applications executing on the third computing device.

22. The system of claim 12, wherein the second computing device includes the second computer hardware, and the first computing device includes the third computer hardware.

* * * * *